United States Patent
Watanabe et al.

(10) Patent No.: US 7,177,459 B1
(45) Date of Patent: Feb. 13, 2007

(54) ROBOT SYSTEM HAVING IMAGE PROCESSING FUNCTION

(75) Inventors: Atsushi Watanabe, Tokyo (JP); Taro Arimatsu, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 09/546,392

(22) Filed: Apr. 10, 2000

(30) Foreign Application Priority Data

Apr. 8, 1999  (JP)  ................................ 11-101891

(51) Int. Cl.
 *G06K 9/00* (2006.01)
(52) U.S. Cl. ...................... 382/151; 382/152; 382/153; 382/154
(58) Field of Classification Search ........ 382/151–154; 901/47
See application file for complete search history.

(56) References Cited

U.S. PATENT DOCUMENTS

| 4,146,924 A | * | 3/1979 | Birk et al. ................... 700/259 |
| 4,305,130 A | * | 12/1981 | Kelley et al. ................ 700/259 |
| 4,410,804 A | * | 10/1983 | Stauffer .................... 250/208.2 |
| 4,437,114 A | * | 3/1984 | LaRussa ...................... 348/94 |

(Continued)

FOREIGN PATENT DOCUMENTS

JP        5-127722        5/1993

(Continued)

OTHER PUBLICATIONS

F. Kececi, et al., "Improving Visually Servoed Disassembly Operations by Automatic Camera Placement", Proceedings of the 1998 IEEE, International Conference on Robotics & Automation, Leuven, Belgium; May 1998.

(Continued)

*Primary Examiner*—Jingge Wu
*Assistant Examiner*—John B Strege
(74) *Attorney, Agent, or Firm*—Staas & Halsey LLP

(57) ABSTRACT

A robot system having an image processing function capable of detecting position and/or posture of individual workpieces randomly arranged in a stack to determine posture, or posture and position of a robot operation suitable for the detected position and/or posture of the workpiece. Reference models are created from two-dimensional images of a reference workpiece captured in a plurality of directions by a first visual sensor and stored. Also, the relative positions/postures of the first visual sensor with respect to the workpiece at the respective image capturing, and relative position/posture of a second visual sensor to be situated with respect to the workpiece are stored. Matching processing between an image of a stack of workpieces captured by the camera and the reference models are performed and an image of a workpiece matched with one reference model is selected. A three-dimensional position/posture of the workpiece is determined from the image of the selected workpiece, the selected reference model and position/posture information associated with the reference model. The position/posture of the second visual sensor to be situated for measurement is determined based on the determined position/posture of the workpiece and the stored relative position/posture of the second visual sensor, and precise position/posture of the workpiece is measured by the second visual sensor at the determined position/posture of the second visual sensor. A picking operation for picking out a respective workpiece from a randomly arranged stack can be performed by a robot based on the measuring results of the second visual sensor.

32 Claims, 8 Drawing Sheets

U.S. PATENT DOCUMENTS

| | | | | |
|---|---|---|---|---|
| 4,462,046 A | * | 7/1984 | Spight | 348/94 |
| 4,611,292 A | * | 9/1986 | Ninomiya et al. | 702/153 |
| 4,680,802 A | * | 7/1987 | Nishida et al. | 382/141 |
| 4,704,694 A | * | 11/1987 | Czerniejewski | 382/288 |
| 4,707,647 A | * | 11/1987 | Coldren et al. | 382/151 |
| 4,785,528 A | * | 11/1988 | Soderberg | 29/701 |
| 4,835,450 A | * | 5/1989 | Suzuki | 318/568.13 |
| 4,876,728 A | * | 10/1989 | Roth | 382/153 |
| 4,879,664 A | * | 11/1989 | Suyama et al. | 700/186 |
| 4,909,376 A | * | 3/1990 | Herndon et al. | 198/395 |
| 4,942,539 A | * | 7/1990 | McGee et al. | 700/253 |
| 4,985,846 A | * | 1/1991 | Fallon | 382/153 |
| 5,047,714 A | * | 9/1991 | Maeno et al. | 324/758 |
| 5,220,619 A | * | 6/1993 | Keokoek | 382/153 |
| 5,329,469 A | * | 7/1994 | Watanabe | 700/259 |
| 5,446,835 A | * | 8/1995 | Iida et al. | 700/259 |
| 5,579,444 A | | 11/1996 | Dalziel et al. | |
| 5,621,807 A | * | 4/1997 | Eibert et al. | 382/103 |
| 5,727,132 A | * | 3/1998 | Arimatsu et al. | 700/259 |
| 5,745,387 A | * | 4/1998 | Corby et al. | 703/1 |
| 5,790,687 A | * | 8/1998 | McLaughlin et al. | 382/111 |
| 5,845,048 A | | 12/1998 | Masumoto | |
| 5,911,767 A | * | 6/1999 | Garibotto et al. | 701/28 |
| 6,135,854 A | * | 10/2000 | Masumura et al. | 451/6 |
| 6,349,245 B1 | * | 2/2002 | Finlay | 700/245 |
| 6,490,369 B1 | * | 12/2002 | Beiman | 382/153 |

FOREIGN PATENT DOCUMENTS

JP      7-270137      10/1995

OTHER PUBLICATIONS

V. Gengenbach, et al., "Automatic Dismantling Integrating Optical Flow Into a Machine Vision-Controlled Robot System", Proceedings of the 1996 IEEE, International Conference on Robotics & Automation, Minneapolis, Minnesota; Apr. 1996.

Jun Miura, "Generating Visual Sensing Strategies in Assembly Tasks", IEEE International Conference on Robotics & Automation, 1995 IEEE.

European Search Report dated Jul. 15, 2005.

* cited by examiner

FIG. 1
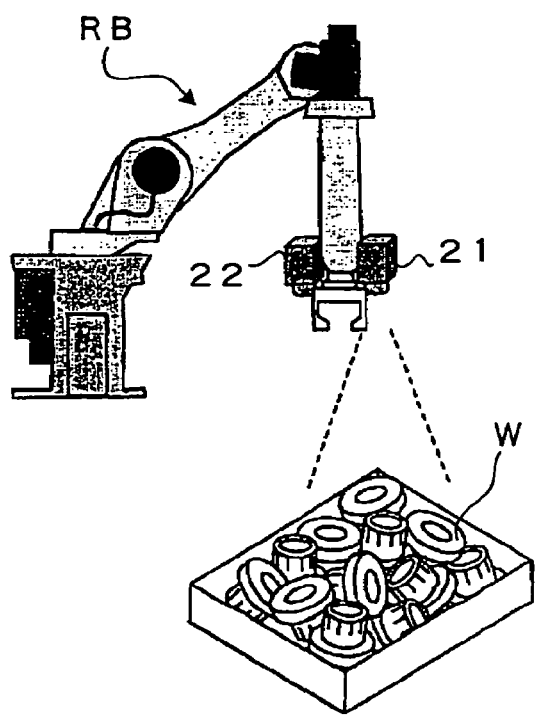
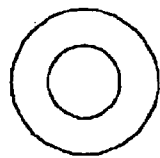
FIG. 2a
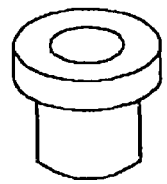
FIG. 2b
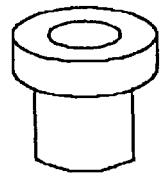
FIG. 2c
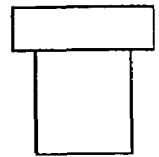
FIG. 2d

| REFERENCE MODEL NO. (M) | FIRST-SENSOR RELATIVE POSITION/POSTURE [RELATIVE POSITION POSTURE OF WORKPIECE WITH RESPECT TO CAMERA] $(X, Y, Z, \alpha, \beta, \gamma)c$ | WORKPIECE-ROBOT RELATIVE POSITION/POSTURE [RELATIVE POSITION POSTURE OF SECOND VISUAL SENSOR TO BE SITUATED WITH RESPECT TO WORKPIECE] $(X, Y, Z, \alpha, \beta, \gamma)wk$ |
|---|---|---|
| 0 | 10.0, -20.8, 50.5, 0.0, 0.0, 0.0 | 35.5, 20.5, 60.9, 0.0, 0.0, 0.0 |
| 1 | 10.0, -20.8, 50.5, 30.0, 0.0, 0.0 | 35.5, 20.5, 60.9, 0.0, 0.0, 0.0 |
| 2 | 10.0, -20.8, 50.5, 60.0, 0.0, 0.0 | 35.5, 20.5, 60.9, 0.0, 0.0, 0.0 |
| 3 | 10.0, -20.8, 50.5, 90.0, 0.0, 0.0 | 35.5, 20.5, 60.9, 0.0, 0.0, 0.0 |

FIG.9 (PRIOR ART)

| Z(m,1) | ... | ... | ... | ... | Z(m,n) |
|--------|-----|-----|-----|-----|--------|
| ... | ... | ... | ... | ... | ... |
| ... | ... | ... | ... | ... | ... |
| ... | ... | Z(i,j) | ... | ... | ... |
| ... | ... | ... | ... | ... | ... |
| Z(1,1) | Z(1,2) | ... | ... | ... | Z(1,n) |

ROBOT SYSTEM HAVING IMAGE PROCESSING FUNCTION

BACKGROUND OF THE INVENTION

1. Field of the Invention

The present invention relates to a robot system having an image processing function of detecting three-dimensional position and posture (orientation) of an object, and in particular to a robot system having an image processing function suitable for a bin-picking operation of taking out a workpiece one by one from a randomly arranged stack of workpieces.

2. Description of Related Art

An operation of taking out an individual workpiece form a randomly arranged stack of workpieces or an aggregation of workpieces contained in a container of a predetermined size, which have identical shapes and different three-dimensional positions/postures, have been performed manually. In storing workpieces in a pallet or placing workpieces at a predetermined position in a machine or a device using a (dedicated) robot, since it has been impossible to directly take out an individual workpiece one by one from the randomly arranged stack of workpieces by the dedicated robot, it has been necessary to rearrange the workpieces in advance so as to be picked out by the robot. In this rearrangement operation, it has been necessary to take out an individual workpiece from the stack manually.

The reason why individual workpieces having identical shapes and different three-dimensional positions/postures can not be picked out by a robot from a randomly arranged stack of workpieces or an aggregation of workpieces contained in a container is that the position/posture of individual workpieces in the stack or the aggregation can not be recognized, so that a robot hand can not be placed to a suitable position/posture at which the robot hand can hold the individual workpiece.

SUMMARY OF THE INVENTION

An object of the present invention is to provide a robot system having an image processing function capable of determining an orientation and/or a position of a robot for performing an operation on an object by precisely detecting three-dimensional position and posture of individual objects in a randomly arranged stack or an aggregation in a container of a predetermined region, which have identical shapes and different three-dimensional positions/postures.

A robot system having an image processing function of the present invention comprises a robot, a first image capturing device, a memory and a processor. The memory stores reference models created based on image data of a reference object captured by the image capturing device in a plurality of directions, and stores information of the capturing directions to be respectively associated with the reference models, and information of orientation of the robot operation with respect to the object. The reference object is the object of detection or an object having a shape identical to that of the object of detection. The processor perform's matching processing on image data containing an image of the object of detection captured by the first image capturing device with said reference models to select an image of an object matched with one of the reference models, and determines orientation, or orientation and position of an operation to be performed by the robot based on the selected image of the object, said one reference model and the information of the capturing direction and the information of the orientation of the robot operation with respect to the object associated with said one reference model.

According to the robot system of the present invention, a robot operation can be performed on an individual object in a stack or an aggregation of plural kinds of objects. In this case, image-data of plural kinds of reference objects are captured by the first image data capturing device to create the reference models based on the captured image data, and information of the kinds is additionally stored to be associated with each reference model. Each of the reference objects is the object of operation of each kind or an object having a shape identical to that of the object of operation of each kind. The processor determines orientation, or orientation and position of the robot operation based on the image of the object and one reference model selected in the matching processing, and the information of the kind associated with said one reference model and the information of the orientation of the robot operation respect to the object associated with said one reference model.

The image capturing device may be a camera for capturing two-dimensional images and in this case the image data of the reference model are captured by the camera from a predetermined distance.

The robot may situate the second image data capturing device to have the determined orientation or to have the determined orientation and the determined position with respect to the object, and the processor may process second image data captured by the second image capturing device to detect position and/or posture of the object with respect to the second image data capturing device.

The robot may also situate the second, image data capturing device to have the determined orientation or to have the determined orientation and the determined position with respect to the object, so that the second image data capturing device is directed to a characterizing portion of the object, and the processor may detect three-dimensional position and/or posture of the object based on three-dimensional position of said characterizing portion obtained by the second image capturing device.

The first image data capturing device can be used as the second image data capturing device.

The second image capturing device may comprise a three-dimensional visual sensor of spot-light scanning type capable of measuring distance between the sensor and an object, or may comprise a structured-light unit for irradiating a structured light on an object and capturing an image of the object including the irradiated light on the object.

The robot operation may be an operation of picking up at least one object form a plurality of objects overlapped with each other.

BRIEF DESCRIPTION OF THE DRAWINGS

FIG. 1 is a diagram for showing a picking operation by a robot to take out an individual workpiece from a stack of workpieces using an image processing apparatus according to an embodiment of the present invention;

FIGS. 2a–2d show an example of reference models;

FIG. 9 is a diagram of the two-dimensional arrangement data containing distance data as image data obtained by the visual sensor;

DETAILED DESCRIPTION OF THE PREFERRED EMBODIMENTS

A robot system having an image processing function according to an embodiment of the present invention will be described. As shown in FIG. 1, a two-dimensional visual sensor 21 such as a CCD camera, as an image capturing device is attached to a wrist of a robot RB. In this embodiment, an image of a stack of workpieces, which are objects of detection having identical shapes and randomly arranged as shown in FIG. 1, is captured by the two-dimensional visual sensor 21, and orientation, or orientation and position of an operation to be performed by the robot RB are determined based on the captured image. Further, rough position and posture of the individual workpieces are detected to determine the orientation of the robot based on the captured image and then precise position and posture of the workpiece are detected by the two-dimensional visual sensor 21 or a three-dimensional visual sensor 22.

For this purpose, images of a reference object, which is one of workpieces W subjected to a picking operation or an object having a shape identical to that of the workpiece W are captured in different directions by the image capturing device and reference models are created from the image data obtained by the image capturing and stored in advance. Matching processing between the image data obtained by capturing the image of the stack of workpieces and the reference models is executed to select an image of one workpiece matched with one of reference models, and a position/posture of the selected workpiece is determined based on the selected image of the workpiece in the image field of view, the selected one of reference modes and the position/posture information associated with the selected one of the reference models.

Figure 3:
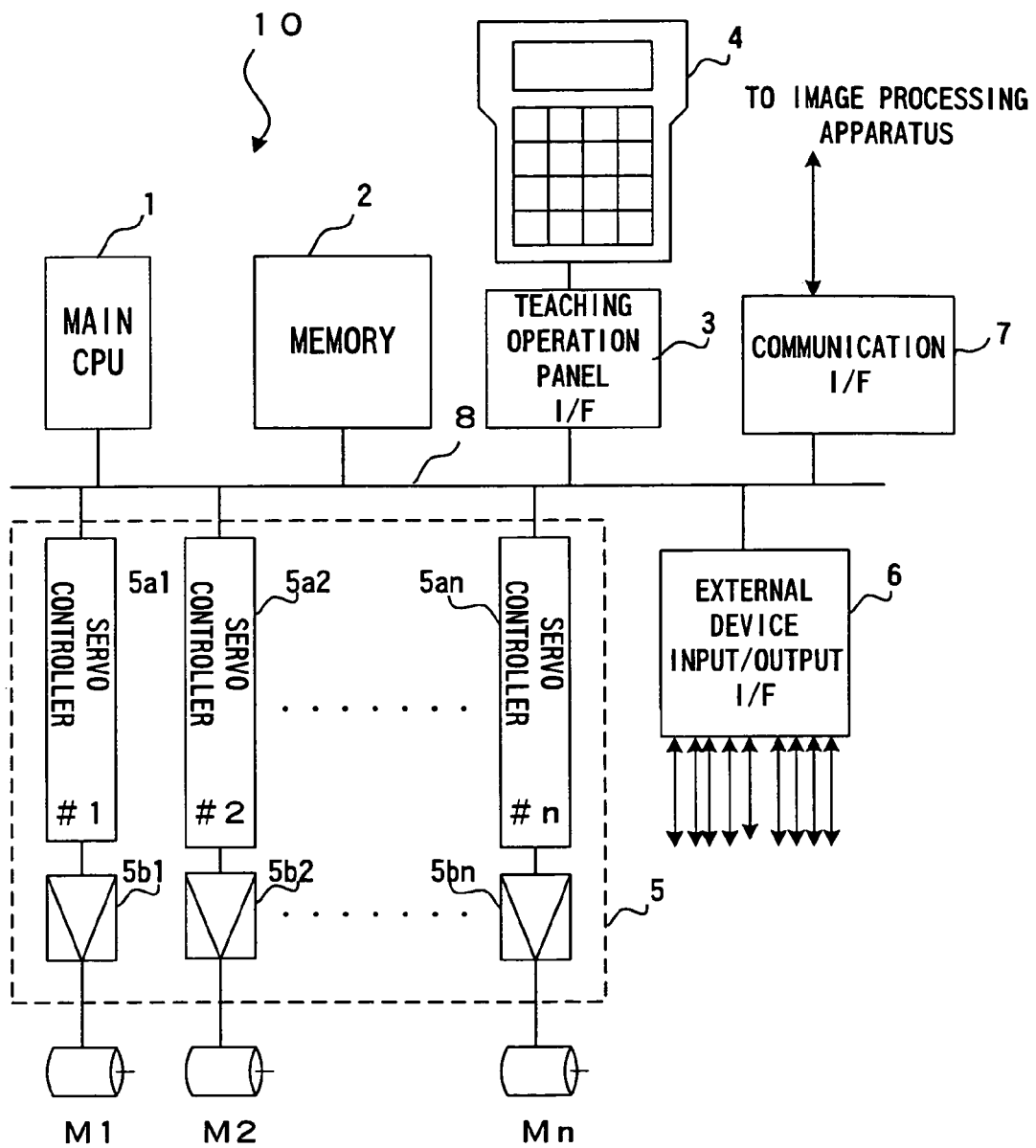
FIG. 3 is a block diagram of a principal part of a robot controller.

FIG. 3 is a block diagram showing a principal part of a robot controller 10 for use in the embodiment of the present invention. A main processor 1, a memory 2 including a RAM, a ROM and a nonvolatile memory (such as an EEPROM), an interface 3 for a teaching operating panel, an interface 6 for external devices, an interface 7 for an image processing apparatus and a servo control section 5 are connected to a bus 8. A teaching operating panel 4 is connected to the interface 3 for a teaching operating panel.

A system program for supporting basic functions of the robot RB and robot controller 10 are stored in the ROM of the memory 2. Robot operation programs and their related determined data which are taught in accordance with various operations are stored in the nonvolatile memory of the memory 2. The RAM of the memory 2 is used for temporarily storage of data for various arithmetic operations performed by the processor 1.

The servo control section 5 comprises servo controllers 5a1 to 5a*n* (n: sum of the number of all the axes of the robot including additional movable axes of a tool attached to the wrist of the robot), each composed of a processor, a ROM, a RAM, etc. Each servo controller performs position/velocity loop control and also current loop control for its associated servomotor for driving the axis, to function as a so-called digital servo controller for performing loop control of position, velocity and current by software. Each servomotor M1–Mn for driving each axis is drivingly controlled according to outputs of the associated servo controller 5a1–5a*n* through the associated servo amplifier 5b1–5b*n*. Though not shown in FIG. 3, a position/velocity detector is attached to each servomotor M1–Mn, and the position and velocity of each servomotor detected by the associated position/velocity detector is fed back to the associated servo controller 5a1–5a*n*. To the input/output interface 6 connected are sensors of the robot, and actuators and sensors of peripheral devices.

Figure 4:
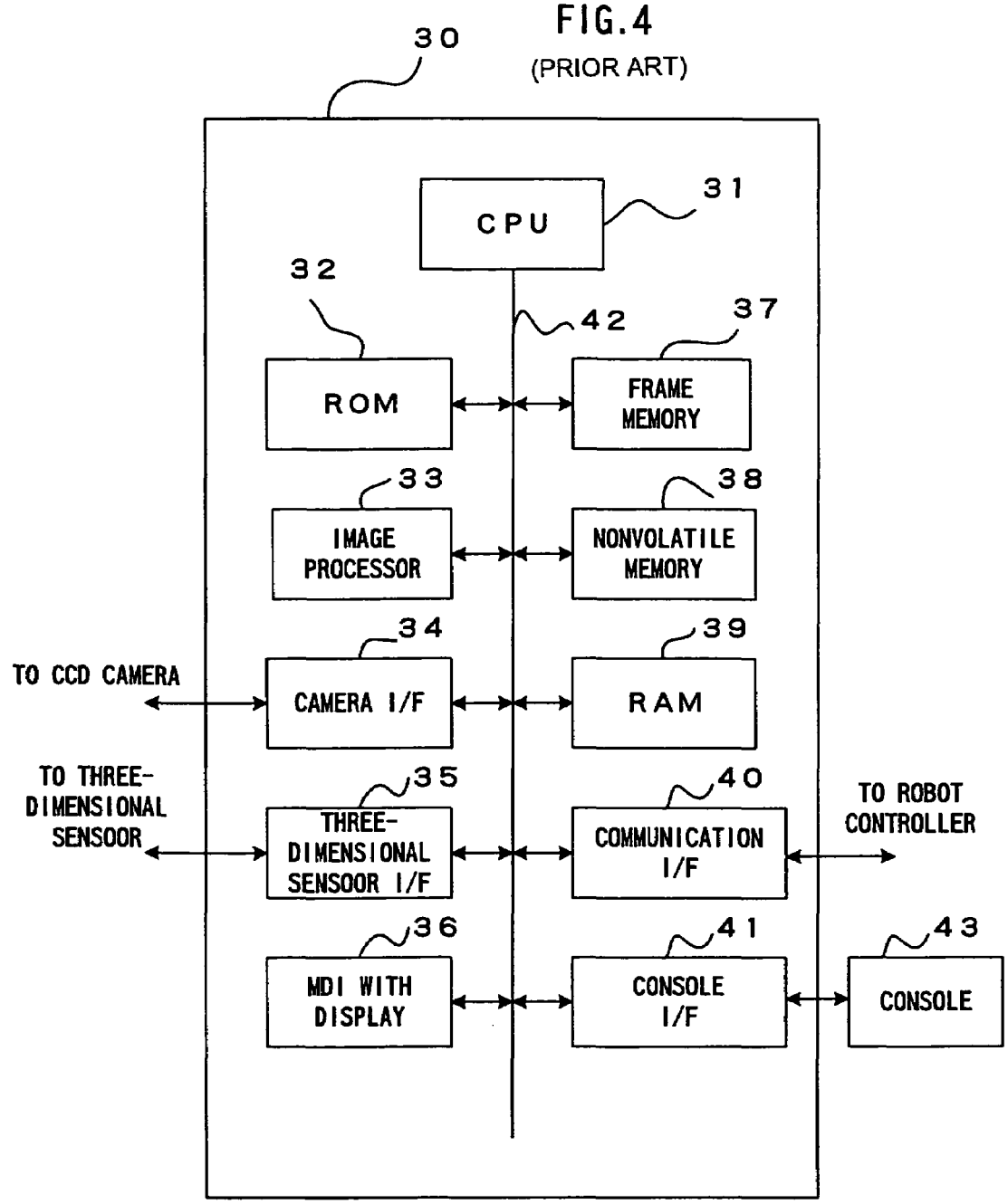
FIG. 4 is a block diagram of the image processing apparatus according to an embodiment of the present invention.

FIG. 4 is a block diagram of the image processing apparatus 30 connected to an interface 7 of the robot controller 10. The image processing apparatus 30 comprises a processor 31 to which a ROM 32 for storing a system program to be executed by the processor 31, an image processor 33, a camera interface 34 connected to a CCD camera 21 which is a first visual sensor as a first image data capturing device, a three-dimensional sensor interface 35 connected to a three-dimensional sensor 22 which is a second visual sensor as a second image data capturing device, a MDI 36 with a display such as a CRT or a liquid crystal display for inputting and outputting various commands and data, a frame memory 37, a nonvolatile memory 38, a RAM 39 for temporary storage of data, a communication interface 40 for the robot controller and a console interface 41 for a console 43 are connected through a bus 42. An image captured by the CCD camera 21 is converted into light and shade image by gray scale and stored in the frame memory 37. The image processor 33 performs image processing of images stored in the frame memory 37 on demand of the processor 31 so as to recognize an object. The architecture and function of the image processing apparatus 30 itself is no way different form the conventional image processing apparatus. The image processing apparatus 30 of the present invention is different form the conventional one in that reference models as described later are stored in the nonvolatile memory 38 and pattern matching processing is performed on an image of a stack of workpieces W captured by the first visual sensor 21 using the reference models to obtain position and posture of a workpiece W and thus orientation, or orientation and position of an operation to be performed by the robot RB. Further, the image processing apparatus of the present invention differs from the conventional one in that approach orientation/position for more precise detection of the position/posture of the workpiece W by the second visual sensor of the three-dimensional visual sensor 22 is determined based on the detected position/posture of the workpiece W using the first visual sensor 21.

The CCD camera for obtaining two-dimensional images data is well known in the art and thus detailed explanation thereof is omitted here. The three-dimensional visual sensor 22 for detecting a three-dimensional position of an object by irradiating structured light (slit beam) on the object is known and used in various fields. This type of sensor may be used as the three-dimensional visual sensor 22. Further, a three-dimensional visual sensor of a spot-light scanning type as disclosed in Japanese Patent Publication No. 7-270137 may be used as the three-dimensional visual sensor 22, and the summary of such three-dimensional visual sensor is described below.

This visual sensor detects a three-dimensional position of an object by irradiating a light beam to form a light spot on the object for scanning the object in two different directions (X direction and Y direction) and by detecting the light reflected on the object by a position sensitive detector (PSD). Three dimensional position of the object is measured by a calculation using the respective inclination angles θx, θy of mirrors for scanning and an incident positions of the reflected light beam on the PSD.

Figures 7, 8:
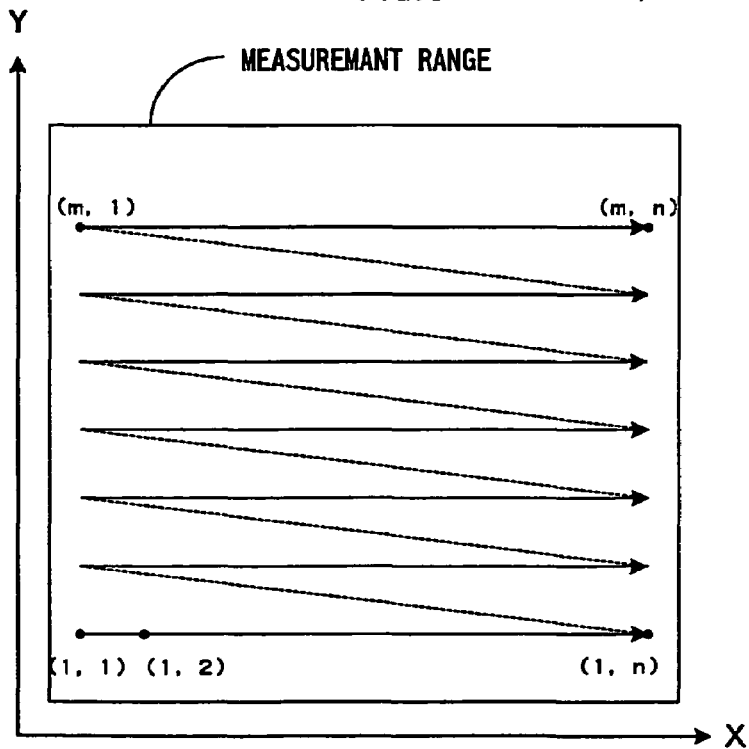
FIG. 7 is a table showing relative positions/postures of the workpiece relative to the first visual sensor and the positions/postures of the second visual sensor to be situated relative to the workpiece in the case of four reference models.
FIG. 8 is a diagram showing an example of scanning motion of a visual sensor capable of obtaining distance data.
Figure 9:
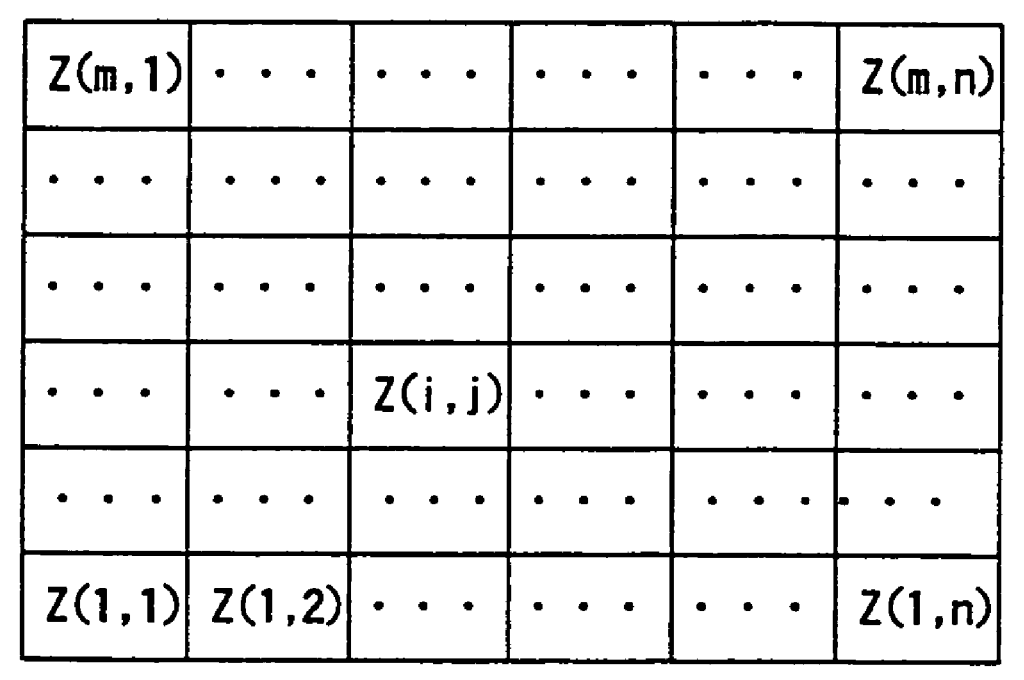
Figure 10:
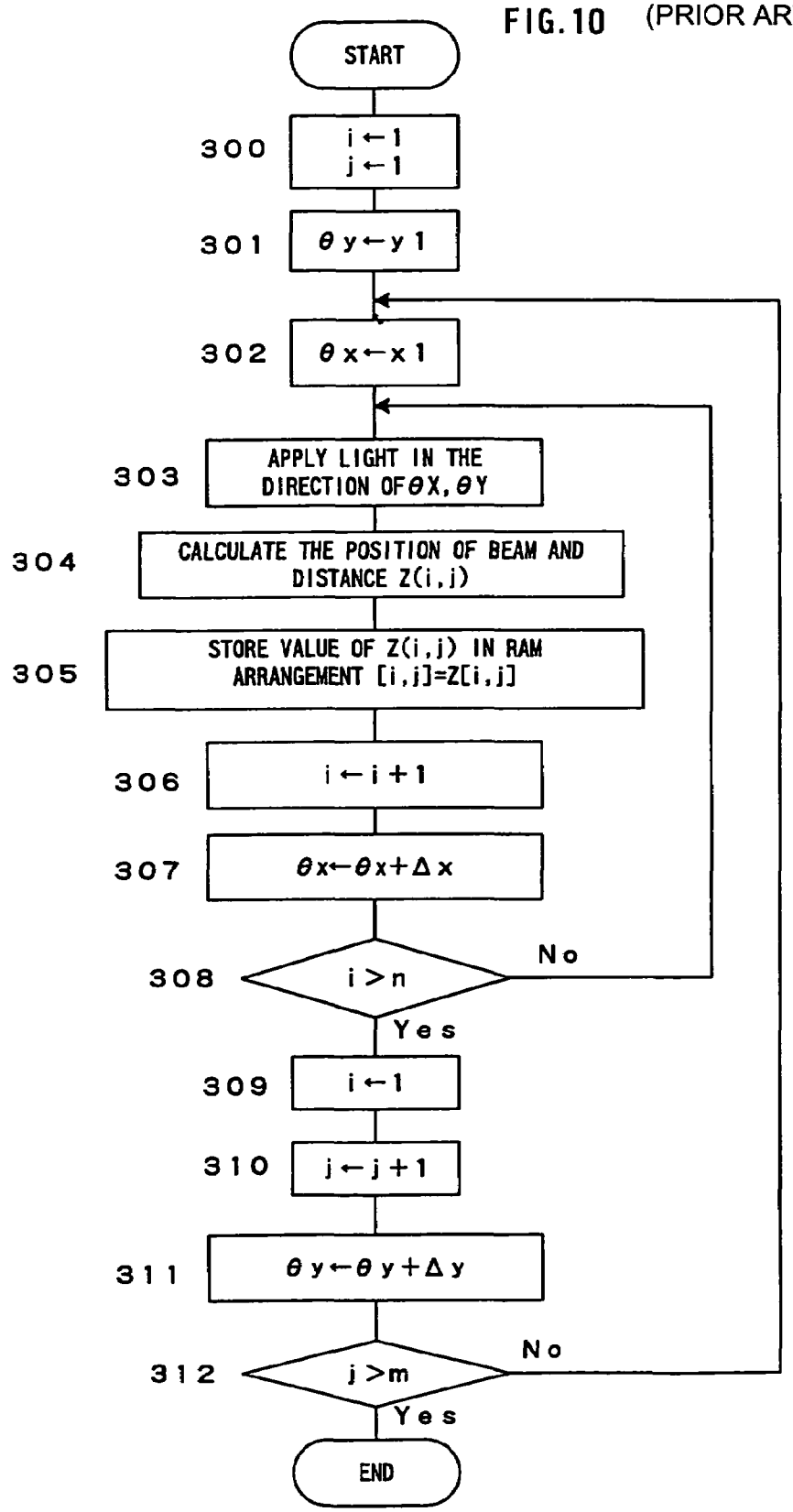
FIG. 10 is a flowchart of processing for obtaining the two-dimensional arrangement data.

Referring to FIGS. 8–10, a method of obtaining two-dimensional arrangement data including distance data using the three-dimensional visual sensor will be explained briefly.

Scanning range (measuring range) on an object is set in advance, and an inclination angle θx, θy of the mirrors is controlled discretely. As shown in FIG. 8, the scanning is performed from a point (1,1) to a point (1, n), from a point (2,1) to a point (2, n), . . . from a point (m, 1) to a point (m, n) on the X-Y plane within the scanning range, to measure three-dimensional positions of each reflected point on the object. Also, a distance Z (i, j) between the sensor and the reflection point (i, j) on the object is obtained and stored in the RAM39 of the image processing apparatus 30. Thus, the image data is obtained as two-dimensional arrangement data including the distance data Z (i, j) between the sensor and the reflection point on the object, as shown in FIG. 9.

FIG. 10 is a flowchart of processing to be executed by the processor 31 of the image processing apparatus 30 for obtaining the image data.

First, indexes i and j are respectively set to "1" (Step 300) and the inclination angle (θx, θy) of the mirrors is set to (x1, y1) to direct to the start point (1, 1) and an irradiation command with the inclination angle is send to the sensor 20 (Steps 301–303). The sensor irradiates a light beam with the mirrors set at the inclination angle. The signal representing the image captured by the PSD is sent to the image processing apparatus 30. The processor 31 of the image processing apparatus 30 calculates the position of the reflection point on the object from the signal from the PSD and the inclination angle (θx, θy) of the mirrors to obtain the distance Z (i, j) between the sensor and the position of the reflection point on the object. This value Z (i, j) is stored in the RAM 38 as the two-dimensional arrangement data [i, j] (Step 304, 305). The calculation for obtaining the position of the reflection point and the distance Z (i, j) may be performed by the sensor 20.

Then, the index i is incrementally increased by "1" and the inclination angle θx of the mirror for X-axis direction scanning is increased by the predetermined amount Δx (Step 306, 307). It is determined whether or not the index i exceeds the set value n (Step 308). If the index i does not exceed the set value n, the procedure returns to Step 303 and the processing from Step 303 to Step 308 is executed to obtain the distance Z (i, j) of the next point. Subsequently, the processing of Steps 303-308 are repeatedly executed until the index i exceeds the set value n to obtain and store the distance Z (i, j) of the respective points (1, 1) to (1, n) shown in FIG. 8.

If it is determined that the index i exceeds the set value n in Step 308, the index i is set to "1" and the index j is incrementally increased by "1" to increase the inclination angle θy of the mirror for Y-axis direction scanning (Steps 309–311). Then, it is determined whether or not the index j exceeds the set value m (Step 312) and if the index j does not exceed the set value m, the procedure returns to Step 302 to repeatedly executes the precessing of Step 302 and the subsequent Steps.

Thus, the processing from Step 302 to Step 312 is repeatedly executed until the index j exceeds the set value m. If the index j exceeds the set value m, the points in the measurement range (scanning range) shown in FIG. 8 has been measured entirely, the distance data Z (1, 1)–Z (m, n) as two-dimensional arrangement data are stored in the RAM 39 and the image data obtaining processing is terminated. A part of the image data of two-dimensional arrangements or a plurality of distance data can be obtained by appropriately omitting the measurement of the distance for the index i.

The foregoing is a description on the processing for obtaining two-dimensional arrangement data as image data using the visual sensor capable of measuring the distance. Using the two-dimensional arrangement data obtained in this way as image data, creation of reference models and detection of position and posture (orientation) of an object can be performed.

In order to simplify the explanation, the following description will be made assuming that a CCD camera is used as the two-dimensional visual sensor 21 and the two-dimensional image data obtained by capturing image of the object by the CCD camera is used.

Figure 5:
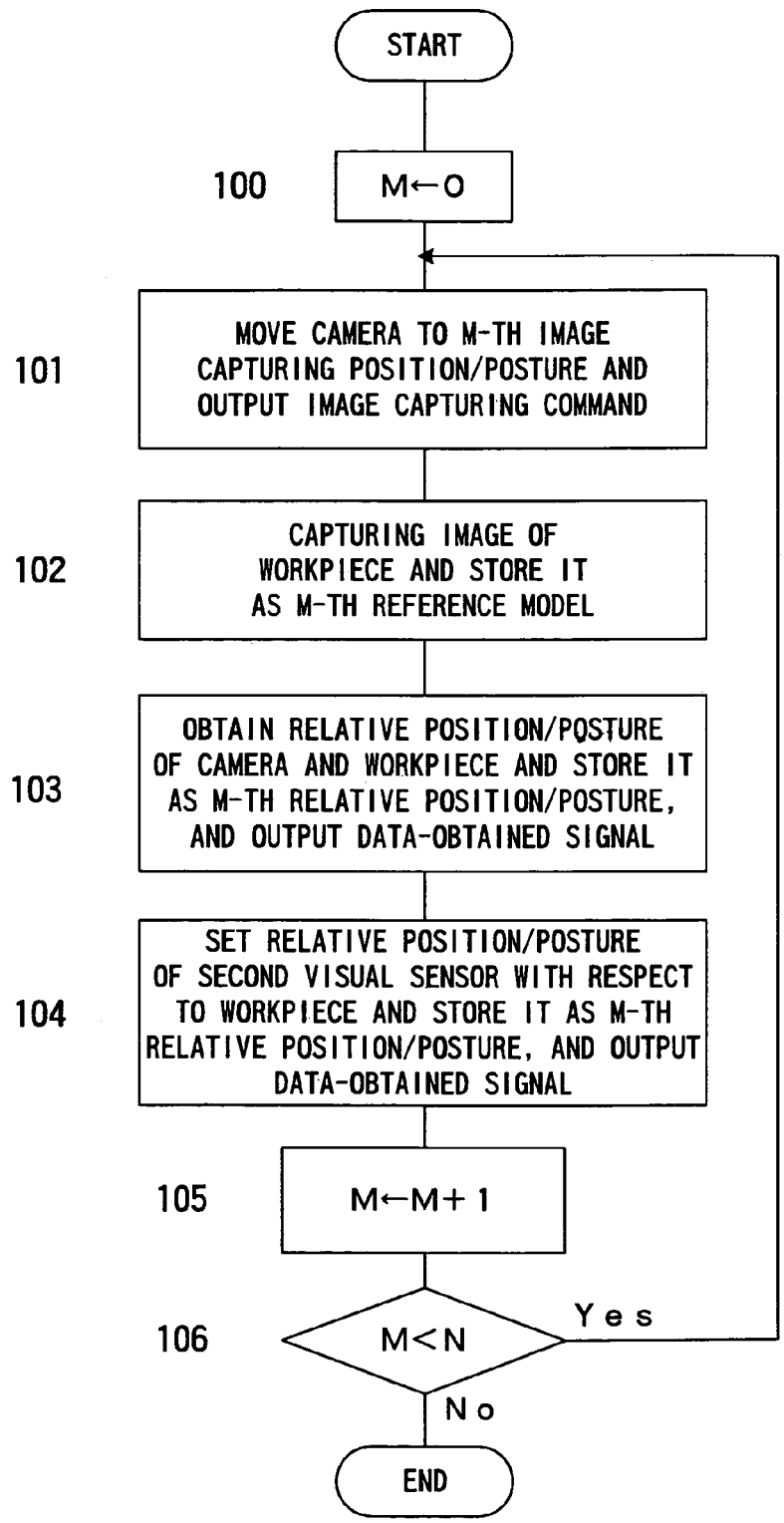
FIG. 5 is a flowchart of the processing for creating reference models.

Processing for creating reference models will be explained referring to FIGS. 2a–2d and FIG. 5. FIG. 5 is a flowchart showing processing for teaching reference models to the image processing apparatus 30 according to the present invention.

One reference workpiece (one of the worpieces W as objects of robot operation or a workpiece having a three-dimensional shape identical to that of the workpiece W) is arranged at a predetermined position with predetermined posture for creating reference models. A first (0-th) position and orientation (posture) of the CCD camera 21 for capturing the image of the object is set, and an axis of rotation and rotation angles with respect to the first (0-th) position and orientation (posture) are set in order to determine the subsequent positions orientations (postures) of the camera 21 from the teaching operation panel 4 of the robot controller 10. In addition, the number of the positions and orientations (postures) of the workpiece at which the camera 21 captures the image of the object are set.

As shown in FIGS. 2a to 2d, in this example, images of the reference workpiece are captured from four different directions and reference models are created based on the four image data. As shown in FIG. 2a, an image of the reference workpiece is captured from the direction of a Z-axis of a world coordinate system at 0-th position/orientation (posture) to create 0-th reference model. For setting the subsequent positions/orientations (postures), an axis perpendicular to an optical axis of the camera and passing a central point of the workpiece (an origin of a work coordinate system set to the workpiece) and rotation angles along the rotation axis are set. Since the optical axis of the camera is set parallel to the Z axis of the world coordinate system, an axis parallel to either the X-axis or the Y-axis of the world coordinate system, which is perpendicular to the Z axis, can be selected and the workpiece is rotated around the rotation axis at the workpiece position.

In the example, an axis parallel to the X-axis of the world coordinate system is set as the rotation axis, and for the position/posture shown in FIG. 2b, the rotation angle of 30° is set to rotate the camera by 30° with respect to the workpiece along the rotation axis. 1st reference model is created based on the image data of the workpiece at the position/orientation (posture) shown in FIG. 2b. Similarly, as shown in FIGS. 2c and 2d, the camera 21 is rotated by 60° and 90°, respectively, along the rotation axis for capturing images of the workpiece to create 2nd and 3rd reference models. Only posture (orientation) information may be stored to be associated with each reference model in the case where the relative position between the camera and the reference workpiece is not changed, as in this example.

Further, in this example, rotation angles of zero degree, 30 degrees, 60 degrees and 90 degrees are set for creating four reference models. The dividing range of the rotation angles may be set more finely and/or range of the rotation angle may be set greater to create more reference models for more precise detection of the position/posture of the workpiece.

Processing of creating the four reference models will be explained referring to flowchart of FIG. 5.

As described above, the 0-th position/posture of the robot at which the camera 20 captures the image of the object, and the rotation axis and the rotation angles with respect to the 0-th position/posture are set in advance in order to determine the subsequent positions/postures of the reference workpiece, and also the number of the subsequent positions/postures of the workpiece are set. For intelligible explanation, it is assumed that an optical axis of the camera is parallel to the Y-axis of the world coordinate system and that a position where the X-axis and Y-axis coordinate values are identical to those of the reference workpiece arranged at a predetermined position with a predetermined posture and only the Z-axis coordinate value is different form that of the position of the reference workpiece is taught to the robot as the 0-th image capturing position for obtaining the 0-th reference model. Further, the positions of the robot where the camera is rotated with respect to the reference workpiece by 30 degrees, 60 degrees and 90 degrees along the axis passing the central point of the reference workpiece and parallel to the X-axis of the world coordinate system are set as the 1st, 2nd and 3rd image capturing position, and the number N of the image capturing positions is set "4."

When a command of creating reference models is inputted from teaching operation panel 4, the processor 1 of the robot controller 10 sets a counter M for counting the number of the image capturing to "0" (Step 100). The robot is operated to have the M-th position/posture and a command for image capturing is outputted to the image processing apparatus 30 (Step 101). In response to this command, the image processing apparatus 30 performs capturing of an image of the reference workpiece with the camera 20 and the captured image data is stored in the frame memory 37. Further, relative position/orientation (posture) of the workpiece with respect to the camera is obtained and stored in the nonvolatile memory 37 as relative position/orientation (posture) of M-th reference model (Step 103). This relative position/posture is hereinafter referred to as "first-sensor relative position/posture". Thus, position/posture of the workpiece in a camera coordinate system set to the camera is obtained from the position/posture of the camera and the position/posture of the reference workpiece in the world coordinate system when capturing the image by the camera, and is stored as the relative position/posture of the workpiece with respect to the camera (the first-sensor relative position/posture). For example, the position/posture of the workpiece in the camera coordinate system is stored as [x0, y0, z0, α0, β0, γ0]c, where α, β and γ mean rotation angle around X-, Y-, Z- axes, and "c" means the camera coordinate system. Further, As described above, in the case where the position of the camera relative to the workpiece is not changed, only the orientation(posture) of the camera [α0, β0, γ0]c is stored to be associated with each reference model as the relative position/posture of the first sensor.

The relative position/posture of (a tool center point of) the robot to be situated with respect to the workpiece, or the relative position/posture of the second visual sensor 22 to be situated with respect to the workpiece is stored to be associated with M-th reference model, for a subsequent operation performed by the robot, i.e., a precise detection of position/posture of the workpiece by the second visual sensor 22. This relative position/posture is hereinafter referred to as "workpiece-robot (second sensor) relative position/posture". Then, a data-captured signal is sent to the robot controller 10 (Step 104).

The workpiece-robot (second sensor) relative position/posture is for determine orientation and/or position of a subsequent operation of the robot RB, i.e., the orientation/position of the robot at which the three-dimensional sensor 22 can detect the object or a characteristic portion of the object more precisely. Alternatively, in the case where the precise detection of the workpiece by the three-dimensional sensor 22 is omitted, the workpiece-robot relative position/posture may be set to the relative position/posture between the tool center point and the workpiece which is most suitable for picking up the workpiece by a robot hand.

The workpiece-robot (second sensor) relative position/posture is stored as position/posture of the tool center point or the three-dimensional visual sensor 22 in a workpiece coordinate system set to the workpiece. The following explanation is given assuming that the relative position/posture of the three-dimensional visual sensor 22 is stored. The workpiece-robot (second sensor) relative position/posture is represented by an approach vector for determining approach position/posture of the three-dimensional visual sensor 22 with respect to the workpiece in precisely measuring position/posture of the workpiece W by the three-dimensional visual sensor 22. One approach vector may be commonly set to reference models created from one kind of reference workpiece, since the optimal position/posture of the tool center point with respect to the workpiece can be determined univocally in accordance with a kind of the workpiece for precisely measuring the position/posture of the workpiece by the three-dimensional visual sensor 22 or picking up the workpiece by the robot hand. The approach vector may be selected from a plurality of patterns prepared in advance and may include orientation (posture) information only.

The workpiece-robot (second sensor) relative position/posture can be expressed by three components $(X, Y, Z)wp$ for parallel motion and three component $(α, β, γ)wp$ for rotation, where wp means the workpiece coordinate system. In this embodiment, the workpiece-robot (second sensor) relative position/posture is commonly set for all the reference models. Further, The information to be stored in Steps 103 and 104 may be gathered as the relative position/posture of the second visual sensor to be situated with respect to the CCD camera 21.

Upon receipt of the data-captured signal, the processor 1 of the robot controller 10 incrementally increase the value of the counter M by "1"(Step 105) and determine whether or not the value of the counter M is less than a set value N (=4) (Step 106). If the value of the counter M is less than the set value N, the procedure returns Step 101 to move the robot to the M-th image-capturing position/posture. Processing of Steps 101 and the subsequent Steps are repeatedly executed until the value of the counter M equals to the set value N(=4).

Thus, the reference models are stored in the nonvolatile memory 38 and also the first-sensor relative position/posture, which is the relative position/posture of the first visual sensor 21 and the workpiece W and the workpiece-robot (second sensor) relative position/posture, which is the position/posture of the second visual sensor 22 (or the robot) to be situated with respect to the workpiece W are stored in the nonvolatile memory 38.

The reference models may be created from a part of the image data of the reference object, and may be created by processing the image data of the reference object.

FIG. 7 shows an example of the first-sensor relative position/posture and the workpiece-robot (second sensor) relative position/posture in the case of four reference models.

The first-sensor relative position/posture is expressed as position/posture of the workpiece W in the camera coordinate system (X, Y, Z, α, 62, γ)c set to the CCD camera 21. The relative positions of the workpiece W, i.e., the positions of the 0-th to 3rd reference models are the same, expressed as (X, Y, Z)=(10.50, −20.80, 50.50), the rotation angles α for 0-th to 3rd reference models for the rotation around the X-axis are set to 0, 60 and 90 degrees, respectively. The CCD camera is rotated around the axis parallel to X-axis of the world coordinate system with a center of rotation set to the origin of the workpiece coordinate system, and since the X-axis of the camera coordinate system is set parallel to the X-axis of the world coordinate system, only the rotation angles a in the camera coordinate system are changed.

The workpiece-robot (second sensor) relative position/posture is expressed as the position/posture of the second visual sensor 22 in the workpiece coordinate system (X, Y, Z, α, β, γ)wp set to the workpiece, and the approach vector (30.5, 20.5, 60.9, 0.0, 0.0, 0.0)wp is set to represent constant orientation with respect to the workpiece W.

The reference models and the relative position/posture of the workpiece W and the camera 20 are stored in the nonvolatile memory 38 of the image processing apparatus 30. In the above described embodiment, the reference models are created using a robot, however, the reference models may be created by a manual operation without using a robot. In this case, the reference workpiece is arranged within a field of view of the camera connected to the image processing apparatus 30, and the images of the workpiece with different postures are captured by the camera. The reference models are created based on the image data and the relative positions/postures of the camera and the workpiece at the image capturing manually inputted, and are stored with the respective relative positions/posteres.

Hereinafter, a picking operation for taking out an individual workpiece by a robot from a stack of workpieces each having a shape identical to that of the reference workpiece will be described, as an example of a method of detecting three-dimensional position/posture of an object, using the image processing apparatus 30 storing the reference models.

Figure 6:
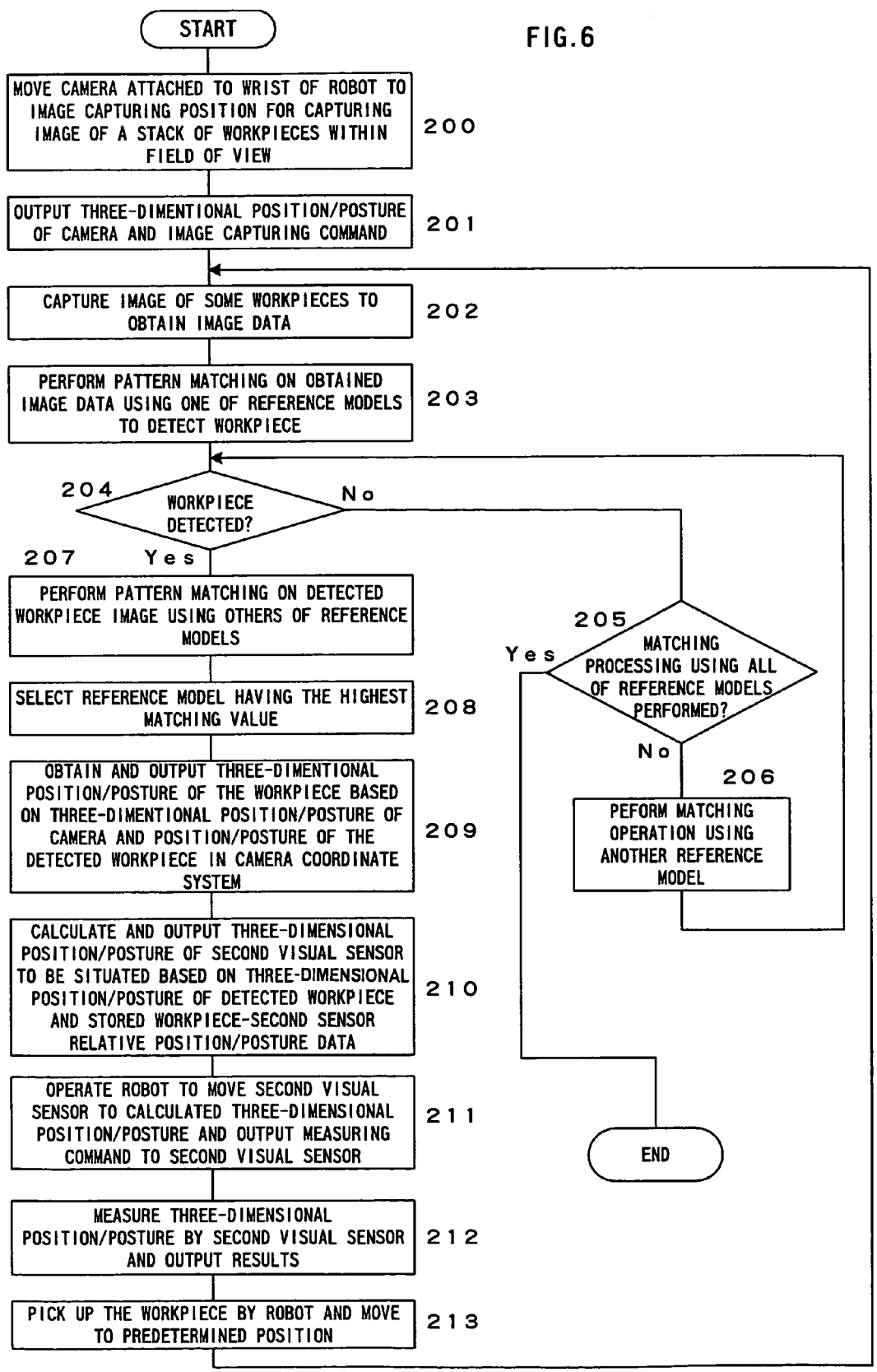
FIG. 6 is a flowchart of the processing for the picking operation.

FIG. 6 is a flowchart of processing for the picking operation using the reference models.

When a picking command is inputted into the robot controller 10 from the teaching operation panel 4, the processor 1 operates the robot RB to move the camera attached to the robot wrist to an image capturing position where a stack of workpieces are within a field of view of the CCD camera 21 (Step 200). Three-dimensional position/posture of the camera 21 on the world coordinate system at this image capturing position is outputted to the image processing apparatus 30, and a image capturing command is outputted (Step 201). Upon receipt of the image capturing command, the processor 31 of the image processing apparatus 30 captures an image of the stack of the workpieces W, to obtain image data of some workpieces W and store it in the frame memory 37 (Step 202).

Then, pattern matching processing is performed for the image data stored in the frame memory 37 using one of reference models (1st reference model) stored in the nonvolatile memory 37 so as to detect a workpiece W (Step 203). In this pattern matching processing, matching of the image data of the reference model with the image data of workpieces is performed on the basis of position, turn and scale. It is determined whether or not an object having a matching value equal or greater than the set value (Step 204). If an object having a matching value equal or greater than the set value is not detected, the procedure proceeds to Step 205 to determine whether or not the pattern matching is performed using all the reference models (1st to 4th reference models). If the pattern matching using all the reference models is not yet performed, further pattern matching is performed using another reference model (Step 206).

If it is determined in Step 204 that an object having a matching value equal or greater than the set value with respect to any of the reference models is detected, the procedure proceeds to Step 207 to perform matching processing on the two-dimensional data of the detected workpieces W, using every taught mode. In Step 208, the reference model having the most large matching value in the pattern matching processing is selected, and the relative position/posture of the workpiece W with respect to the camera 21 is determined based on the first-sensor relative position/posture, i.e., the relative position/posture of the camera and the reference workpiece stored for the selected reference model, and position, rotation angle and scale of the image of the workpiece in the matching processing. Also, data of the workpiece-robot (second sensor) relative position/posture associated with the selected reference model, which represent the position/posture of the second sensor 22 to be situated with respect to the workpiece are read from the nonvolatile memory 38 (Step 208).

The reference model having the highest matching value is selected in this embodiment, however, a reference model of the rotation angle of zero degree (the 0-th reference model) may be selected with precedence, or an object having the highest expansion rate of scale (the object which is nearest to the camera, i.e. located at the summit of the stack in this example) may be selected with precedence.

The position and posture (orientation) of the detected workpiece on the world coordinate system is determined from the position and posture of the camera 21 in the world coordinate system, which has been sent in Step 201, and the relative position/posture of the workpiece W with respect to the camera 21, and is outputted (Step 209). Thus, since the relative position/posture of the workpiece W with respect to the camera 21 is the position/posture of the workpiece W in the camera coordinate system, the position and posture (orientation) of the detected workpiece W in the world coordinate system is obtained by an arithmetic operation of coordinate transformation using the data of the position/posture of the workpiece W in the camera coordinate system and the position/posture of the camera 20 in the world coordinate system (Step 209).

The position/posture of the second visual sensor 22 to be situated for a subsequent operation in the world coordinate system is determined based on the determined position/posture of the detected workpiece W in the world coordinate system and the workpiece-robot (second sensor) relative position/posture data (approach vector) (Step 210). The processor 31 operates the robot to situate the second visual sensor 22 to have the determined position/posture, and outputs a measuring command to the second visual sensor 22 (Step 211).

Upon receipt of the measuring command, the three-dimensional sensor 22 measures a three-dimensional position/posture of the workpiece W. Since the second visual sensor 22 is situated at the suitable position/posture with respect to the workpiece W designated by the approach vector, the three-dimensional position/posture of the workpiece W can be precisely measured. The processor 31 of the image processing apparatus 30 outputs the result of measurement to the robot controller 10 (Step 212).

The robot controller 10 operates the robot to perform a picking operation to grip and hold the detected workpiece W and move the held workpiece W to a predetermined position, based on the result of measurement by the three-dimensional visual sensor 22 (Step 213). Then, the procedure returns to Step 202 to repeatedly execute the processing of Step 202 and subsequent Steps.

When all the workpieces have been picked form the stack of the workpieces, matching value equal to or greater than the set reference value cannot be obtained in the pattern matching processing for all reference models in Steps 203–206, and the picking operation is terminated.

In the case where a stack of the workpieces can not fall within the field of view of the camera 21/22, or in the case where it is not necessary to capture an image of a workpiece behind other workpieces by changing the orientation of the camera, the procedure may return to Step 200 when it is determined "Yes" in Step 205, to move the camera to another position/posture at which an image of the objective workpiece can be captured.

In the foregoing embodiment, the three-dimensional sensor 22 is adopted as the second visual sensor for precisely detecting the position/posture of the workpiece, however, the two-dimensional sensor may be adopted instead of the three-dimensional sensor. In the case where the two-dimensional sensor is adopted as the second visual sensor, the second sensor may be provided in addition to the first visual sensor, or the first visual sensor may function as the second visual sensor.

The position/posture of the individual workpiece in the stack of workpieces is roughly detected by the first visual sensor and the precise position/posture of the detected workpiece is detected by the second visual sensor situated at the suitable position/posture which is nearer to the workpiece W to improve the precision of detection. Therefore, when the first visual sensor takes place of the second visual sensor, precise position/posture of the workpiece can be detected by capturing the image of the detected workpiece W from the shorter distance and performing the matching processing by the CCD camera as the second sensor.

Further, in the case where a wide-angle lens is installed in the CCD camera as the image capturing device, for example, there is possibility of judging the inclination angle to be 30 degrees by influence of parallax when a workpiece of zero degree inclination is at a corner of a field of view of the camera. In such a case, the camera may be moved parallelly in accordance with the position of the workpiece in the field of view of the camera to a position right above the workpiece to lose influence of parallax, and at this position the image capturing processing of Step 201 and the subsequent Steps in FIG. 6 is performed so that the false judgment is prevented.

Furthermore, in the foregoing embodiment, the first visual sensor is mounted on the distal end of the robot wrist, however, the first visual sensor may be a stationary camera fixed at a place above the stack of the workpieces. In this arrangement, a distance between the camera and the workpieces is rendered to be longer to prevent the influence of parallax. Also, it is not necessary to operate the robot to move for capturing the image of the workpieces by the first visual sensor to shorten the cycle time.

In the foregoing embodiment, one kind of objects (workpieces) are detected and picked up, however, the robot system can be modified to detect and pick up plural kinds of objects (workpieces).

In this case, Ma number of reference models created from a reference workpiece of a kind A and Mb number of reference models created from a reference workpiece of a kind B are prepared and information of the kind A or B is additionally stored to be associated with each reference model. Then, matching processing between the captured image and the (Ma+Mb) number of reference models to select the matched reference model, and the kind information in addition to the orientation and/or position for the subsequent operation are determined. In this way, it is not necessary to separate the objects according to the kind of object in advance, so that the mixed kinds of objects can be picked up one by one to reduce the operation cost.

In the foregoing embodiment, the position/posture of the object is roughly determined based on image data captured by the first visual sensor and the precise position/posture of the detected workpiece is measured by the second visual sensor, however, the second image capturing device may be omitted and the orientation and/or position of the robot operation can be determined using the first image data capturing device only. In this case, the relative position/posture of the robot (tool center point) to be situated with respect to the workpiece is stored as the workpiece-robot relative position/posture.

According to the present invention, a position/posture of an objective workpiece in a randomly arranged stack of workpieces of one kind or a plurality of kinds, or an aggregation of workpieces of one kind or a plurality of kinds gathered in a predetermined region, which have different three-dimensional positions/postures, is detected, and an orientation/position of an operation on the detected workpiece by a robot is determined. Further, the second image data-capturing device measures the position/posture of the workpiece more precisely at the determined position/posture (approach vector) for the robot operation. Therefore, the robot can securely perform a picking operation of picking up an individual workpiece from such a stack or an aggregation.

What is claimed is:

1. A robot system having an image processing function for determining orientation, or orientation and position of a robot operation on one of a plurality of objects, the system comprising:
    a robot;
    a first image capturing device capturing image data of the plurality of objects containing respective images of the objects;
    a memory storing reference models, each comprising an image of a reference object captured by said image capturing device in a different direction, and for each reference model storing information of the capturing direction of its associated image and information of an orientation of the robot with respect to the reference object, the information of the capturing direction representing a rotational posture of the reference object relative to the robot, said reference object being one of the plurality of objects or an object having a shape identical to that of one of the plurality of objects; and a processor to perform matching on the image data containing images of the plurality of objects captured by said first image capturing device with each of said reference models successively to select one object having an image matched with one of said reference models, and to determine orientation, or orientation and position of the robot operation based on the image of the selected one object, based on said one reference model and the information of its associated capturing direction, and based on the information of the orientation of the robot operation with respect to the reference object that is associated with said one reference model.

2. A robot system having an image processing function according to claim 1, wherein said reference models are obtained from a part of the image data of the reference object.

3. A robot system having an image processing function according to claim 1, wherein said reference models are obtained by processing the image data of the reference object.

4. A robot system having an image processing function according to claim 1, wherein said first image capturing device comprises a camera for capturing two-dimensional image data.

5. A robot system having an image processing function according to claim 4, wherein said image data of the reference object are captured by said camera from a predetermined distance.

6. A robot system having an image processing function according to claim 1, further comprising:

a second image capturing device; wherein said robot situates said second image data capturing device to have said determined orientation or to have said determined orientation and said determined position with respect to the selected one object, and wherein said processor processes second image data captured by said second image capturing device to detect position and/or rotational posture of the selected one object with respect to said second image data capturing device.

7. A robot system having an image processing function according to claim 1 further comprising:

a second image capturing device for obtaining three-dimensional position; wherein said robot situates said second image data capturing device to have said determined orientation or to have said determined orientation and said determined position with respect to the selected one object, so that said second image data capturing device is directed to a characterizing portion of the object; and wherein said processor detects three-dimensional position and/or posture of the selected one object based on three-dimensional position of said characterizing portion obtained by said second image capturing device.

8. A robot system having an image processing function according to claim 6, wherein said first image data capturing device is used as said second image data capturing device.

9. A robot system having an image processing function according to claim 6, wherein said second image capturing device comprises a three-dimensional visual sensor of spotlight scanning type capable of measuring distance between the sensor and an object.

10. A robot system having an image processing function according to claim 6, wherein said second image data capturing device comprises a structured-light unit for irradiating a structured light on the selected object and capturing an image of the object including the irradiated light on the object.

11. A robot system having an image processing function according to claim 7, wherein said robot operation is an operation of picking up the selected one object from the plurality of objects, some of which are overlapped with each other.

12. A robot system having an image processing function for determining orientation, or orientation and position of a robot operation on one of a plurality of objects of plural kinds, where the orientation of the operation corresponds to a determined orientation of the one object, where the determined orientation is a rotational posture of the one object, the system comprising:

a robot;

a first image capturing device capturing image data of the plurality of objects containing respective images of the objects;

a memory storing reference models, each comprising images of each of different kinds of reference objects corresponding to images captured by said first image capturing device, and storing indicia of the kinds respectively associated with said reference models, and information of a different orientation of the robot with respect to each of the different images of the reference object of each kind, where the captured information of orientation comprises information of a rotational posture of the reference object relative to the robot, each of said reference objects being one of the kinds of the plurality of objects or having a shape identical thereto; and a processor to perform matching on the image data containing images of the plurality of objects captured by said first image capturing device with each of said reference models successfully to select one object having an image matched with one of said kinds of the reference models, and to determine orientation, or orientation and position of the robot operation, the determining based on the image of the selected one object, based on said one reference model, based on the indicia of the kind associated with said one reference model and the information of the orientation of the robot operation with respect to the reference object associated with said one reference model of said one kind.

13. A robot system having an image processing function according to claim 12, wherein said reference models are obtained from a part of the image data of the reference object.

14. A robot system having an image processing function according to claim 12, wherein said reference models are obtained by processing the image data of the reference object.

15. A robot system having an image processing function according to claim 12, wherein said first image capturing device comprises a camera for capturing two-dimensional image data.

16. A robot system having an image processing function according to claim 15, wherein said image data of the reference object are captured by said camera from a predetermined distance.

17. A robot system having an image processing function according to claim 12, further comprising a second image capturing device, wherein said robot situates said second image data capturing device to have said determined orientation or to have said determined orientation and said determined position with respect to the object, and wherein said processor processes second image data captured by said second image capturing device to detect position and/or posture of the selected one object with respect to said second image data capturing device.

18. A robot system having an image processing function according to claim 12, further comprising:

a second image capturing device for obtaining three-dimensional position; wherein said robot situates said second image data capturing device to have said determined orientation or to have said determined orientation and said determined position with respect to the selected one object, so that said second image data capturing device is directed to a characterizing portion of the object; and wherein said processor detects three-dimensional position and/or posture of the selected one object based on three-dimensional position of said characterizing portion obtained by said second image capturing device.

19. A robot system having an image processing function according to claim 17, wherein said first image data capturing device is used as said second image data capturing device.

20. A robot system having an image processing function according to claim 17, wherein said second image capturing device comprises a three-dimensional visual sensor of spotlight scanning type capable of measuring distance between the sensor and an object.

21. A robot system having an image processing function according to claim 17, wherein said second image data capturing device comprises a structured-light unit for irradiating a structured light on the selected one object and capturing an image of the object including the irradiated light on the object.

22. A robot system having an image processing function according to claim 18, wherein said robot operation is an operation of picking up the selected one object from the plurality of objects, some of which are overlapped with each other.

23. A method for automatically determining an arrangement of a workpiece relative to a robot, where the determined arrangement comprises at least rotational posture arrangement of the workpiece relative to the robot, the method comprising:

storing reference images corresponding to images of the workpiece or an object so shaped (workpiece/object) and reference arrangement information indicating arrangements of the robot and workpiece/object relative to each other when the images were captured, the reference arrangements comprising rotational arrangements of the workpiece relative to the robot;

from a known arrangement of the robot, capturing a working image of the workpiece among a plurality of randomly arranged workpieces with an imaging device;

finding one of the reference images that matches the workpiece in the working image; and determining an arrangement of the robot relative to the workpiece based on information indicating the known arrangement of the robot, and based on the reference arrangement information corresponding to the found reference image, where the determined arrangement comprises rotational arrangement of the workpiece relative to the robot.

24. A method according to claim 23, wherein reference images and reference arrangement information is obtained for workpieces/objects of different shapes, and wherein the finding comprises first determining that a reference image of one of the different shapes matches the working image of the workpiece, and then finding one reference image of the shape that best matches the working image.

25. A method according to claim 23, wherein the robot is used to capture the reference images, and wherein the reference arrangement information represents arrangements of the robot when capturing the reference images.

26. A method according to claim 23, wherein a second imaging device is affixed to the robot and is used to determine additional arrangement information used to determine the known arrangement of the robot relative to the workpiece.

27. A robot system having an image processing function according to claim 7, wherein said first image data capturing device is used as said second image data capturing device.

28. A robot system having an image processing function according to claim 7, wherein said second image capturing device comprises a three-dimensional visual sensor of spotlight scanning type capable of measuring distance between the sensor and an object.

29. A robot system having an image processing function according to claim 7, wherein said second image data capturing device comprises a structured-light unit for irradiating a structured light on an object and capturing an image of the object including the irradiated light on the object.

30. A robot system having an image processing function according to claim 18, wherein said first image data capturing device is used as said second image data capturing device.

31. A robot system having an image processing function according to claim 18, wherein said second image capturing device comprises a three-dimensional visual sensor of spotlight scanning type capable of measuring distance between the sensor and an object.

32. A robot system having an image processing function according to claim 18, wherein said second image data capturing device comprises a structured-light unit for irradiating a structured light on an object and capturing an image of the object including the irradiated light on the object.

* * * * *

UNITED STATES PATENT AND TRADEMARK OFFICE
CERTIFICATE OF CORRECTION

| | |
|---|---|
| PATENT NO. | : 7,177,459 B1 |
| APPLICATION NO. | : 09/546392 |
| DATED | : February 13, 2007 |
| INVENTOR(S) | : Atsushi Watanabe et al. |

It is certified that error appears in the above-identified patent and that said Letters Patent is hereby corrected as shown below:

In the drawings:

FIG. 4 (Opposite to Box 35), Line 3, change "SENSOOR" to --SENSOR--.

FIG. 4, Box 35, Line 3, Change "SENSOOR" to --SENSOR--.

FIG. 6, Box 201, Line 1, change "THREE-DIMENTIONAL" to --THREE-DIMENSIONAL--.

FIG. 6, Box 206, Line 1, change "PEFORM" to --PERFORM--.

FIG. 6, Box 209, Line 1, change "THREE-DIMENTIONAL" to --THREE-DIMENSIONAL--.

FIG. 6, Box 209, Line 3, change "THREE-DIMENTIONAL" to --THREE-DIMENSIONAL--.

FIG. 8 (Below FIG. 8), Line 1, change "MEASUREMANT" to --MEASUREMENT--.

Column 1, Line 60, change "perform's" to --performs--.

Column 2, Line 51, change "form" to --from--.

Column 7, Line 65, change "As" to --as--.

Column 8, Line 54, change "The" to --the--.

Column 9, Line 18, change "62" to --$\beta$--.

Column 9, Line 49, change "posteres." to --postures.--.

UNITED STATES PATENT AND TRADEMARK OFFICE
CERTIFICATE OF CORRECTION

PATENT NO. : 7,177,459 B1
APPLICATION NO. : 09/546392
DATED : February 13, 2007
INVENTOR(S) : Atsushi Watanabe et al.

It is certified that error appears in the above-identified patent and that said Letters Patent is hereby corrected as shown below:

Column 12, Line 46, change "data-capturing" to --data capturing--.

Signed and Sealed this

Twenty-second Day of May, 2007

JON W. DUDAS
*Director of the United States Patent and Trademark Office*